(12) United States Patent
Stibel

(10) Patent No.: US 7,089,236 B1
(45) Date of Patent: Aug. 8, 2006

(54) SEARCH ENGINE INTERFACE

(75) Inventor: Jeffrey M. Stibel, East Greenwich, RI (US)

(73) Assignee: Search 123.com, Inc., Westlake Village, CA (US)

( * ) Notice: Subject to any disclaimer, the term of this patent is extended or adjusted under 35 U.S.C. 154(b) by 844 days.

(21) Appl. No.: 09/419,005

(22) Filed: Oct. 13, 1999

Related U.S. Application Data

(60) Provisional application No. 60/140,874, filed on Jun. 24, 1999.

(51) Int. Cl.
*G06F 17/30* (2006.01)

(52) U.S. Cl. .......................................................... 707/5
(58) Field of Classification Search ............... 707/1–10
See application file for complete search history.

(56) References Cited

U.S. PATENT DOCUMENTS

| | | | |
|---|---|---|---|
| 5,309,359 A | 5/1994 | Katz | |
| 5,404,295 A | 4/1995 | Katz | |
| 5,721,902 A | 2/1998 | Schultz | |
| 5,873,076 A | 2/1999 | Barr | |
| 5,893,093 A | 4/1999 | Wills | |
| 5,926,811 A * | 7/1999 | Miller et al. ..................... | 707/5 |
| 5,956,711 A | 9/1999 | Sullivan | |
| 5,960,422 A | 9/1999 | Prasad | |
| 5,966,126 A | 10/1999 | Szabo | |
| 5,974,413 A | 10/1999 | Beauregard | |
| 6,101,492 A * | 8/2000 | Jacquemin et al. ............. | 707/3 |
| 6,256,633 B1 * | 7/2001 | Dharap ......................... | 707/10 |
| 6,421,675 B1 * | 7/2002 | Ryan et al. ................. | 707/100 |

FOREIGN PATENT DOCUMENTS

WO   WO 99/06924   2/1999

OTHER PUBLICATIONS

Ginsberg (A unified approah to automatic indexing and information retrieval, IEEE, Oct. 1993, pp. 46-56).*
DtSearch Search Requests; DT Software, Inc. www.dtsearch.com.

(Continued)

*Primary Examiner*—Hosain Alam
*Assistant Examiner*—Joon Hwan Hwang
(74) *Attorney, Agent, or Firm*—Niro, Scavone, Haller & Niro

(57) ABSTRACT

The invention provides, inter alia, front ends to a database search engine or engines, that process a user query to generate a new search request that will more effectively retrieve information from the database that is relevant to the query of the user. To this end, in one embodiment the systems can be realized as computer programs present to a user interface to a user and which prompt the user to enter one or more key phrases that are representative of a user search request or user query. The user interface can collect the key phrases provided by the user and can analyze these key phrases to identify at least one meaning that can be associated with this user query. The systems can then process the user query and the identified meaning to generate an expanded search request that can be represented as a boolean search strategy. This boolean search strategy can then be processed to create one or more expanded user queries that can be presented to a search engine to collect from a search engine information that is relevant to the interest of the user.

22 Claims, 6 Drawing Sheets

OTHER PUBLICATIONS

Miller, George; "Introduction to WordNet: An On-Line Lexical Database"; (Revised Aug. 1993).

"DtSearch Search Requests: Overview", www.dtsearch2.com/Samples/SearchHelp.htm. (1997).

Miller et al., Introduction to WorldNet : An On-Line Lexical Database (Revised Aug. 1993).

George A. Miller, "Nouns in WordNet: A Lexical Inheritance System" (Revisted Aug. 1993).

Fellbaum et al., "Adjectives in WordNet", (Revised Aug. 1993).

Christiane Fellbaum, "English Verbs as a Semantic Net", (Revised Aug. 1993).

Beckwith et al., "Design and Implementation of the WordNet Lexical Database and Searching Software", (Revised Aug. 1993).

* cited by examiner

SEARCH ENGINE INTERFACE

REFERENCE TO RELATED APPLICATIONS

This application claims priority to U.S. Ser. No. 60/140,874, filed 24 Jun., 1999, entitled Search Engine, and naming Jeffrey M. Stibel as inventor, the contents of which are hereby incorporated by reference.

FIELD OF THE INVENTION

The invention relates to systems and methods for allowing database users to generate accurate user queries.

BACKGROUND OF THE INVENTION

The growth rate of the Internet is unmatched by any other medium in history. The number of U.S. Internet users has grown from 49 million in 1996 to over 96 million as of March 1999. These numbers are expected to increase by at least 20% over the next few years. Accordingly, each day thousands of new users, from all over the world, begin accessing the Internet and using the Internet as a communication and data processing tool. Research has shown that both new users and experienced users see the highest value of the Internet to be as a research tool that allows a user to collect information, including information related to commercial transactions, and information related to entertainment. In fact, Internet users rank searching as their most important activity on the Web with over 50% of all Web-active individuals (approximately 50 million) visiting a search engine each month. However, research has also shown that a major frustration for Internet users is the inability to quickly locate information available on the Internet.

To locate information, a user typically employs a search engine, such as the Yahoo™ or Lycos™ search engines, to identify information of interest. These Internet search engines are services that monitor the content of the Internet, typically focusing on the content provided through the World Wide Web Internet service. While monitoring the content, the company builds a database of index terms that can be associated with different sites, or pages of available on the Internet. For example, two of the leading search engines, Excite.™. and Yahoo.™. employ a staff of editors that browse the content of the World Wide Web and manually classify and index the Web pages they review. Other search engines rely on computer programs to search through the content of the Web and to automatically classify and index the Web pages that are visited. In either approach, when the process is completed a datafile is created that includes thousands of index terms, each of which has been associated with a plurality of pages on the Web. When a user accesses a search engine and submits a keyword, or user query to the search engine, it is this index that is searched and it is the pages associated with keywords related to the user query that are returned to the user as the search results.

Although search engines generally work quite well, they require a certain facility on the part of the user to return accurate and useful results. However, as a large portion of Internet users are novices, the conventional search engine fails to provide a large portion of the Internet population with a help full tool for navigating among the countless web sites.

To help make search engines more accessible and effective, most search engines now give users the option of directory or keyword searches. However, neither of these techniques is truly sufficient, and frustration among search engine users is increasing. Some studies have shown that having a keyword search on a particular site is actually less helpful than having people navigate through links. This inability of users to find what they are searching for is one reason why most search engines share much of their audience with the competition. While satisfaction with search engines remains high, it has dropped recently. Moreover, this frustration might also explain why approximately 25% of all people who try the Internet become discouraged and never return.

To address these issues, many search engines are attempting to improve performance by modifying the back end-determining what pages should be catalogued and how. One web search engine uses the popularity of a site to rank its relevance. Another uses a question and answer paradigm to match related queries. Various metacrawlers, which return results from a number of different search engines, take into account the problems of shared audience. However, the interfaces of these search engines differ little beyond the cosmetic.

So far, only a few search engines have tackled the problem of the front-end interface. That is, how to get the user to give more information, so the resultant search query is more directed and effective. One has constructed a paradigm in which people ask a question, then choose among a list of alternative questions. These pre-determined questions have known answers among the sites catalogued by the search sites. Other search engines have users enter the search string in one of a number of different categories (e.g., Jobs, Medicine, and Sports) and then send the query to different search engines.

Neither of these methods is ideal. The search engine market thus needs an interface that allows novice users to produce effective search queries, allow for disambiguating words with multiple meanings, and learn from previous interactions with a client to more quickly focus on the real interests of a user.

SUMMARY OF THE INVENTION

The systems and methods described herein include systems that, inter alia, operate as a front end to a database search engine or engines, and act to process a user query to generate a new search request that will more effectively retrieve information from the database that is relevant to the query of the user. To this end, in one embodiment the systems can be realized as computer programs that act as front ends to databases. The front ends may include a user interface that is presented to a user and which may prompt the user to enter one or more key phrases that are representative of a user search request. The user interface may collect the key phrases provided by the user and may analyze these key phrases to identify at least one meaning that may be associated with this user search request. The systems may then process the user search request and the identified meaning to generate an expanded search request that may be represented as a compound search string, such as a boolean search string, or other logical string. This compound search string may then be processed to create one or more expanded user queries that may be presented to a search engine to collect from a search engine information that is relevant to the interest of the user.

More particularly, in one aspect the invention is realized as processes for aiding a user and developing a search query. These processes may comprise the steps of presenting to the user an interface for collecting from the user a key phrase representative of a user search request, or user query. The processes may also include the steps of analyzing the user search request to identify at least one meaning associated with that user search request, and processing that user search request and the at least one meaning to generate an expanded search request that may be represented as a boolean, or other logical, search strategy. In a further step, the process to provide these expanded search requests to one or more search engines each of which is capable of identifying information as associated with this expanded search request. In one particular practice when presenting the user an interface, the process may provide a source of profile data that is representative of information that may be displayed to the user for guiding the user to supply information for refining the user search request. This such profile data may include providing category information that is capable of being selected by the user to identify a topic associated with the user search strategy, and may also include providing profile data that includes providing subcategory information which is capable of being displayed to the user in response to the user's selection of a category and capable of providing information for refining the user's search strategy.

In a further particular practice, when the process analyzes the user search request, the process may determine a plurality of different meanings each of which may be associated with the user search request. In these processes, the process of analyzing the user search request may include matching a portion of the key phrases entered by the user, or otherwise obtained, against a linguistic database to identify a list of associated meanings. Optionally, the list of associated meanings may be processed to generate a display that presents to the user a plurality of meanings associated with the key phrase or key phrases and which aid the user in disambiguating between a plurality of different meanings. For example, in this process the list of associated meanings may generate a menu of choices any one of which, or several of which may be selected by the user to assign at least one of the associated meanings to the key phrase. When analyzing user search request, the processes may adjust the user interface as a function of the associated meaning to present to the user a request for information for refining the user search request. Other such modifications and additions may be made to the present invention without departing from the scope thereof.

In a further optional practice, the processes for the invention may include the act of generating for the user a linguistic database that includes information which is representative of the key phrases and the associated meanings employed by that user. In this practice, the processes of the invention may analyze the user information for building a user database that may include meanings that the user has indicated, among other ways, by previous search requests as relevant to certain terms, words or key phrases. To this end, the systems described herein may include login screens that employ user names, cookies, or other mechanisms for establishing an identity of a user and to identify a database associated with that user, or a group of related users. Additionally, in optional practices, the processes described herein may from time to time, such as once a month, process the personal database of users to determine meanings identified by a user or a group of users as relevant to a term, phrase, date, numeric value, domain space, web site, or other information that may be representative of topic or meaning. Identified meanings may be entered into a system wide knowledgebase for use by the general user population, or selected portions of the general user population. Optionally, analyzing a search request may include accessing demographic information associated with the user for generating the expanded search request.

In a further aspect, the invention may be understood as systems for aiding a user in developing a search request. Such systems may comprise a linguistic knowledge base having information that is representative of a list of sense signals, each sense signal being information for describing a linguistic meaning, and a list of words where systems may further include a controller for generating an interface for collecting from a user a key phrase that is representative of a user search request and for employing the key phrase to access information from the linguistic knowledge base to generate an expanded search request. A query mechanism may further be included for processing the expanded search request to generate a set of logical search requests, each of which may be associated with at least one preselected search engine and for providing each boolean search request to a respected preselected one of these search engines. Alternative embodiments of the systems described herein may be realized including those wherein systems further include means for adjusting the user interface as a function of the information accesses from the linguistic database, for guiding the user in disambiguating between the different meanings for the key phrase. In a further optional embodiment, the systems may include a mechanism for generating a linguistic database for the user, wherein the database includes information representative of the key phrases and associated meanings that are employed by the user. Similarly, mechanisms for identifying demographic information associated with the user and for employing that demographic information for expanding the user search request may also be provided.

In a further optional embodiment, the systems described herein may include mechanisms for accessing flag signals from the linguistic knowledge base, wherein the flag signals are representative of control information capable of controlling the type of expanded search requests that may be generated.

BRIEF DESCRIPTION OF THE DRAWINGS

The foregoing and other objects and advantages of the invention will be appreciated more fully from the following further description thereof, with reference to the accompanying drawings wherein.

DESCRIPTION OF THE ILLUSTRATED EMBODIMENTS

To provide an overall understanding of the invention, certain illustrative embodiments will now be described, including a system that acts as a front end that aids a user in creating search queries for extant search engines, such as extant Internet search engines. These systems may collect a query string from the user and process the query string to identify a meaning, or a set of meanings, that may be associated with the user query. Through an interactive process, the user may be allowed to select from a list of choices specific meanings or contexts to be associated with the user query. The systems may employ the selected meanings to amend the user query and to generate an expanded query string that will more accurately collect data from the Internet search engines. In this way, a user that inputs an ambiguous search string into a search engine, such as a search string that comprises one word, having a plurality of different meanings, such as the term "bank", may be aided by the system in developing the original search string into a meaningful search strategy for identifying documents that are on point for the interest of the user. This allows the user to interact with the system to create more meaningful search strategies, and may be employed to create a conversational atmosphere, as if the computer were asking the user to help clarify the meaning of the collected user query. This interaction simulates a more natural discourse style, and leads to improved search results, particularly for less experienced users.

Although the invention will now be described with reference to certain illustrative systems and methods, including such front end search engine systems, it will be understood by one of ordinary skill in the art that the systems and methods described herein may be adapted and modified for other suitable applications and that such other additions and modifications will not depart from the scope hereof.

Figure 1:
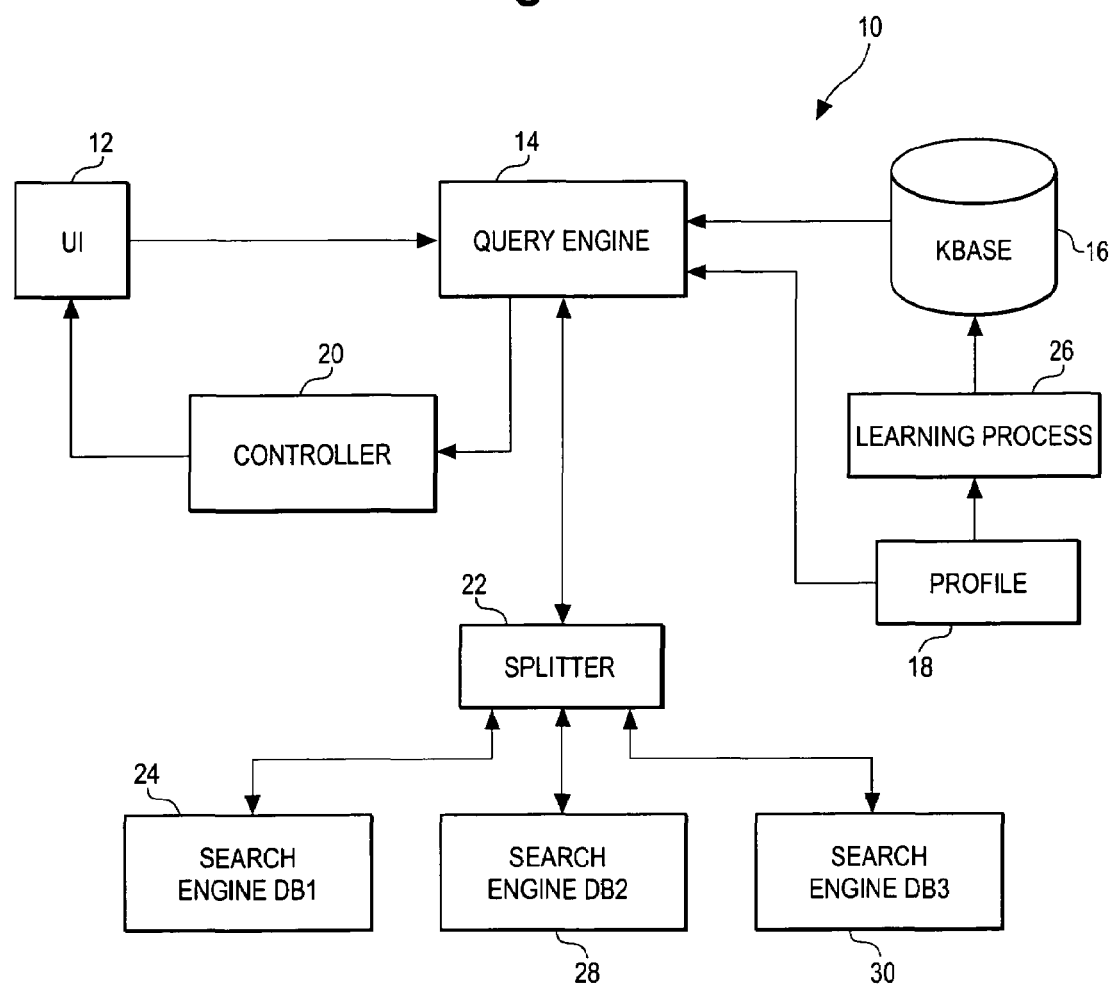
FIG. 1 depicts a functional block diagram of one system for aiding a user in developing a user query for identifying information from a search engine.

FIG. 1 depicts one particular system 10 according to the invention for allowing a user to develop a more sophisticated search string for retrieving information from a database, such as an Internet search engine database. More particularly, FIG. 1 depicts a system 10 that includes a user interface 12, a query engine 14, a knowledge base 16, a profile database 18, a controller 20, a splitter mechanism 22, a learning process module 26, and three search engine databases 24, 28 and 30, respectively. The system 10 depicted in FIG. 1 can be implemented as a computer process executing on a data processing system that may be a conventional data processing platform such as an IBM PC-compatible computer running the Windows operating systems, or a SUN workstation running a Unix operating system, such as a MIPS R10000, based mullet-processor Silicon-Graphic Challenge server, running IRIX 6.2. Alternatively, the data processing system can comprise a dedicated processing system, such as a single board computer (SBC) that can be incorporated into a standalone system, such as a tourist kiosk, or a telecommunications device. In a further alternative embodiment, the data processing system may comprise a micro-controller system, such as any of the commercially available micro-controllers including the 8051 and 6811 class controllers that can be embedded into portable computing and communication devices.

The front end system 10 depicted in FIG. 1 includes a user interface 12 that may be presented to a user to collect from the user a user query, typically representative of a search string for being presented to a search engine. The user interface 12 couples to the query engine 14 and may deliver to the query engine 14 the user query collected from the user. The query engine 14 may access information from the knowledge base 16 and the profile database 18 for the purpose of attempting to match the user query to information stored within the relational knowledge base 16 and the profile database 18. If the key phrases within the user query can be recognized by matching these key phrases to the information within the knowledge base 16, the query engine can receive from the knowledge base 16 a list of meanings that are associated with the matched key words. The query engine 14 can provide the identified list of meanings to the controller 20. Similarly, the query engine 14 can collect from the profile database 18, any available list of meanings that is stored within the user profile database 18 and which match the user query, or key phrases within the user query collected through the user interface 12. The controller 20 can employ the lists of meanings to generate a new user interface that may be presented to the user and which will provide to the user the opportunity to indicate which of the identified meanings the user wishes to associate with the user query that was previously entered. Optionally, if the query engine failed to collect from the knowledge base 16 or the user profile database 18 any meanings that can be associated with the user query, the controller can detect the lack of meanings associated with the user query and can create a user interface that prompts the user to enter a meaning to be associated with the user query. The entered meaning may be stored in a database, such as the user profile database and it may be employed in subsequent searches by the user.

Once the user has either selected or provided a meaning for the user query, the user query and the meaning can be passed to the query engine 14 which may again access the knowledge base 16 and the user profile database 18 to identify a set of words that may be related to the meaning selected by the user. The query engine 14 may then employ the related words and the user query to create an expanded query that is understood to more accurately retrieve information from a search engine about the topic of interest to the user.

As shown by FIG. 1, the query engine may present the expanded query to the splitter mechanism 22. The splitter mechanism 22 may format the expanded query into formats, each of the formats being suitable or compatible with the search logic and data formatting expected by a respective one of the search engines 24, 28 or 30.

The user interface 12 depicted in FIG. 1 may be a conventional user interface of the type commonly presented to a user on a computer screen. In one particular embodiment, the user interface 12 is an HTML page that may be viewed by a user through a browser process operating on a conventional computer workstation. For example, the user interface 12 may be an HTML page downloaded by the user through a browser process, such as the Netscape Navigator browser or the Internet Explorer browser. The HTML page user interface 12 may comprise an HTML form of the type that employs on the FORM element which allows a web site to solicit user input by prompting the user to fill in text fields within the HTML page. The information collected through the HTML page user interface 12 may be transferred to the query engine 14 by, for example, the post or get functions under the HTTP protocol. Accordingly, in this embodiment the query engine and controller may be part of, or optionally accessible by, a web server such as the Apache web server, or any suitable HTTP server process, including those well known in the art, such as those described in Jamsa, *Internet Programming*, Jamsa Press (1995), the teachings of which are herein incorporated by reference. The server may connect to a wide area network, such as the Internet, via an appropriate connection, such as a shared 10 megabit ethernet connection to a router. Preferably the router is selected for its proximity to a major internet node, such as the MAE-EAST Internet node. The web server operates to serve HTML pages, and other files to a client browser process. In one embodiment, the system 10 can provide to the user a login page that directs the user to enter a username and a password. This identity information can be employed by the system 10 to identify a user profile database, such as the depicted user profile database 18, that can be mounted by the system 10 for the user during the users search. Optionally, Netscape cookies can be employed to determine user identity. Any other suitable techniques can be employed for identifying user identity without departing from the scope of the invention.

Figure 2:
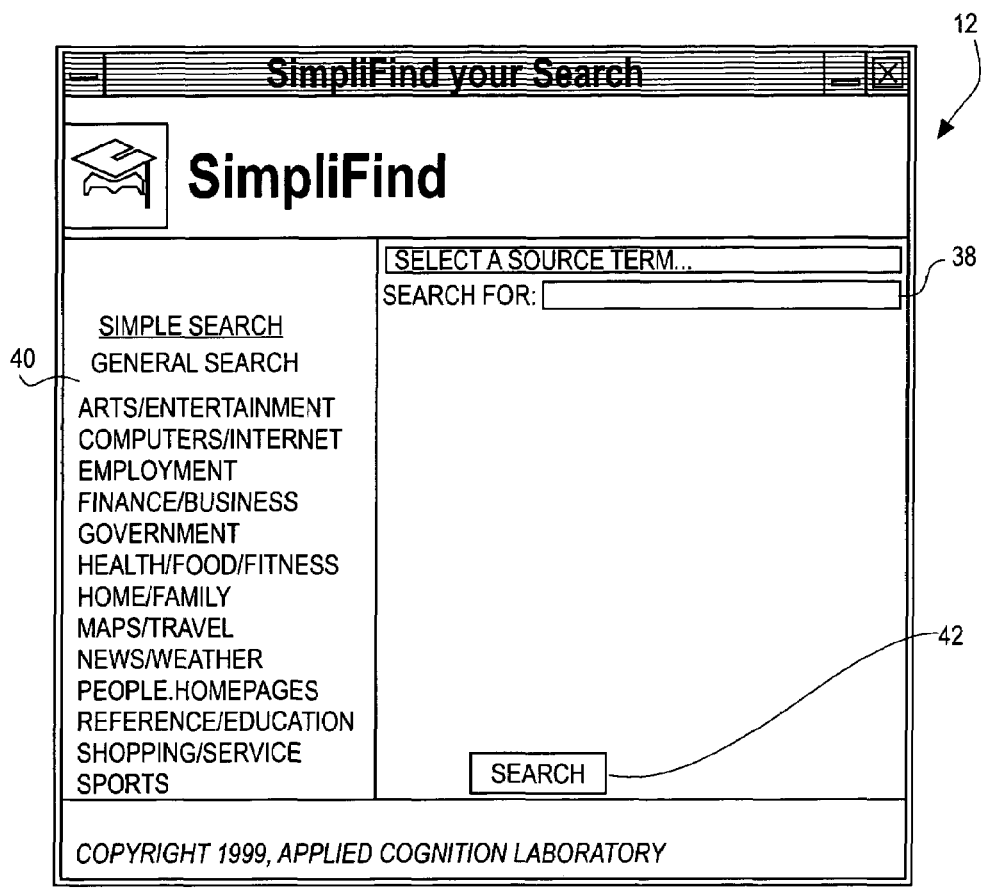
FIG. 2 depicts one example of a user interface for collecting query data from the user.

FIG. 2 depicts one example of a user interface 12 suitable for use with the system 10 depicted in FIG. 1. Specifically, FIG. 2 depicts a user interface 12 that comprises an HTML page having a text input field 38, a side bar of the potential category choices 40, and a transmit control 42. The user interface 12 may be presented to the user through a conventional web browser, and the user may enter a user query into the text input field 38. For example, a user interested in learning about coffee may type the user query "java" into the text input field 38. Optionally, the user may further select, typically by operating a mouse input device, one or more of the category choices displayed in the sidebar 40. After entering the text and optionally selecting a category, the user may activate the transmit control 42. The transmit control 42 can correspond to an HTML form element send action that allows the HTTP mechanism to send the data to the web server that cooperates with the query engine 14.

The query engine 14 depicted in FIG. 1 may be a software module executing as a process on a server platform, and in particular may be a server application executed through a web server API, by implementation of a common gateway interface (CGI) script, or by any other suitable technique, including any of the techniques described in Graham, *HTML Sourcebook*, Wiley Computer Publishing (1997) the teachings of which are herein incorporated by reference. The query engine 14 may collect the user query provided by the user through the interface 12 and processes the key phrases within the user query to identify one or more meanings that may be associated with the user query. The query engine 14 may be a computer process, such as an executing Perl script that parses the text of the user query to generate a set of one or more key phrases each key phrase being representative of one word within the user query. The Perl script then apply the key phrases to the knowledge base 16, and optionally to the user profile database 18.

The knowledge base 16 may be a software module executing as a computer process on a server platform, such as the server platform that supports the query engine 14 and the web server communicating with the client browser supporting the user interface 12. In one embodiment, the knowledge base 16 is a semantic knowledge base system that stores a lexical reference system that allows for key phrases to be mapped to conceptual abstractions, these abstractions being associated with a plurality of different words and phrases. For example, in one embodiment the knowledge base 16 is a lexical database that divides the lexicon of a language into a plurality of different categories. For example in one embodiment the knowledge base 16 divides the lexicon from the English language into five categories, wherein these categories include nouns, verbs, adjectives, adverbs and function words. One such lexical database is the WordNet lexical database described among other places in Miller et al., Introduction to WordNet: An Online Lexical Database, August 1993; Miller, G. A. 1985. 'Wordnet: A Dictionary Browser' in *Information in Data*, Proceedings of the First Conference of the UW Centre for the New Oxford Dictionary. Waterloo, Canada: University of Waterloo; Miller, G. A. 1986; and Beckwith, R., Fellbaum, C., Gross, D., and Miller, G. A. (in press). 'WordNet: A Lexical Database Organized on Psycholinguistic Principles' in Zernik, U. (ed.). *Using On-line Resources to Build a Lexicon*. Hillsdale, N.J.: Erlbaum. Other sources of information relevant to the lexical database include: 'Dictionaries in the Mind.' *Language and Cognitive Processes* 1: 171–185. Miller, G. A. (in press). 'Lexical Echoes of Perceptual Structure' in *The Perception of Structure*, in honor of W. R. Garner. Washington, D.C.: American Psychological Association. Miller, G. A., and Charles, W. (in press). 'Contextual Correlates of Semantic Similarity.' *Language and Cognitive Processes*. Miller, G. A., and Fellbaum, C. (submitted). 'Semantic Networks of English.' *Cognition*. Miller, G. A., and Gildea, P. M. 1987. 'How Children Learn Words.' *Scientific American* 257: No. 3: 94–99, the teachings of which are herein incorporated by reference. Such a knowledge base 16 allows for the organization of lexical information in terms of word meanings, rather than word forms. By allowing the key phrases within the user query to be used as entry points into the knowledge base 16, a set of meanings, or senses, may be retrieved from the knowledge base 16.

More particularly, the knowledge base 16 in one embodiment is a relational database that stores a plurality of word meanings and a plurality of word forms wherein the association between word forms and word meanings and maintains a relationship between the word meanings and the word forms. It will be understood by those of ordinary skill in the art that to reduce ambiguity, the term word form is being employed herein to refer to the physical utterance or inscription of a word and the term word meaning is being employed to refer to the lexicalized concept that a form can be used to express. A word form can include a word, numeric value, graphic, sound, domain name, web site, or any other symbol or device for representing information. Similarly, a word meaning can represent a topic, action, category, web site, domain name, quantity, or any other similar lexicalized concept. Moreover, it will be understood that the knowldegebase 16 can include information in different languages, such as English, German, and French, to allow a user to identify foreign language terms that may be relevant to a particular user query. Both word forms and word meanings can be presented in a plurality of such different languages. This can be particularly helpful for novice Internet users that have limited English Language skills.

Table 1 provides one example of a lexical matrix.

TABLE 1

Illustrating the Concept of a Lexical Matrix:
$F_1$ and $F_2$ and synonyms; $F_2$ is polysemous

| Word Meanings | Word Forms | | | | |
|---|---|---|---|---|---|
| | $F_1$ | $F_2$ | $F_3$ | ... | $F_3$ |
| $M_1$ | $E_{1,1}$ | $E_{1,2}$ | | | |
| $M_2$ | | $E_{2,2}$ | | | |
| $M_3$ | | | $E_{3,3}$ | | |
| . | | | | . | |
| . | | | | | |
| $M_m$ | | | | | $E_{m,n}$ |

Specifically as shown in that Table 1 word forms, $F_n$ are presented as headings for the columns in the table and word meanings are presented as headings for the rows in the table. An entry in a cell of the matrix implies that the form in that column may be employed, in an appropriate context, to express the meaning in that row. Thus, for example, the entry $E_{1,1}$ implies that the form $F_1$ can be used to express word meaning $M_1$. If there are two entries in the same column, the word form is deemed polysemous; if there are two entries in the same row, the word forms are synonymous. From a review of Table 1 it can be seen that the knowledge base provides a mapping between word forms and word meanings that is many to many. For example, the word form "java" can be associated with a plurality of different word meanings, $M_1$, $M_2$ . . . $M_m$ such as coffee, programming languages, and Pacific Islands. In other practices, the word meanings can include domain names possibly associated with the user query, such as Sun.Java.Com, or HotJava.com. In still other practices, foreign language terms, as well as locations, and landmarks, can be provided that have been identified as associated with the word form Java. Accordingly, the word form java which could be associated with a row heading $F_{java}$, would have multiple entries within the column beneath the word form heading $F_{java}$. Each of these entries would correspond with one of the associated word meanings, such as coffee, programming languages and South Pacific Islands.

Figure 3:
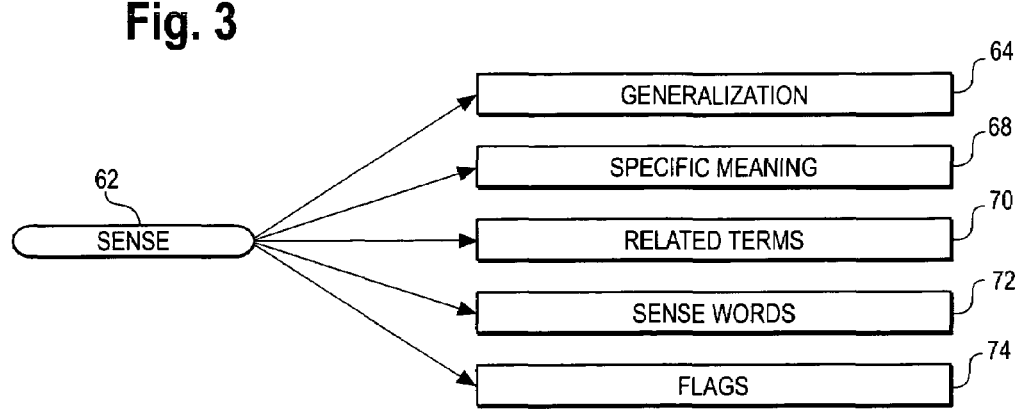
FIGS. 3–5 depict data structures for organizing information relevant to the meaning of a user query.

In one particular embodiment, the knowledge base 16 comprises two types of entities, Senses and Words. The knowledge base 16 can store a Sense as a data structure that has associated with it five items. FIG. 3 depicts more specifically a sense element 62 that includes a plurality of members 64 through 74. Specifically, the members include a generalization member 64, a specific meaning member 68, a related terms member 70, sense words member 72 and flags 74. As shown in FIG. 3, these items can include a generalization member that is representative of the Sense that is the closest term that represents a generalization for the associated Sense; a specific meaning that can be an optional string representative of the meaning to be displayed to the user for the Sense; related terms each being representative of a word form or Sense or Word meaning that is likely to appear on a web page when a user is querying for information associated with this Sense; Sense Words which may be representative of a list of words from the knowledge base 16 that have this Sense as one of their meanings; and a flag member that may contain flags associated with this Sense. Flags can be employed to indicate special conditions that can be used by the system for controlling information presented to a user. For example, a flag could indicate that the Sense is associated with adult content and should be omitted for restricted searching.

A Word may be stored as a data structure having two meanings. The first meaning may be Senses which provides the list of Senses that corresponds to the different meanings for this word, and spellings which may be a list of different spellings for this word. The different spelling could include English verses American spellings, common misspellings, abbreviations, different tenses, and different forms of a root verb, such as the gerund or the infinitive.

Figure 4:
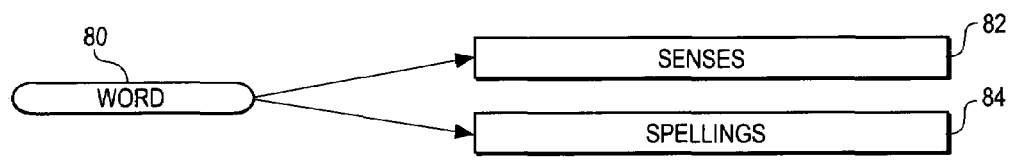

An abstract depiction of a word structure that includes a Senses element and a Spelling element is depicted in FIG. 4. Specifically, FIG. 4 depicts that the word data structure 80 can comprise a senses member 82 and a spellings member 84.

Figure 5:
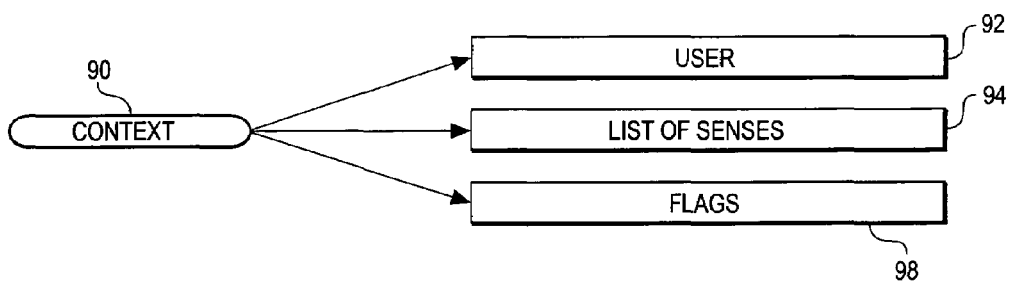

Similarly, FIG. 5 depicts one embodiment of a data structure for a Context data element that includes three members. FIG. 5 depicts that the context data structure can include three members including the user member 92, the list of senses member 94 and the flags member 98 The first member user is understood to include information that represents the current user. This user information may be employed to get user specific properties and, optionally, to access a user-private knowledge base when appropriate. The Senses member depicted in FIG. 5, may include information that is representative of a list of Senses, which may include all Senses of a given word, that correspond to the query the user is currently working on. The Senses member may be employed for such things as finding the concept associated with the word, ordering meanings so that the most likely meaning is given highest priority, and eliminating unlikely terms. The flags member may store information that is representative of flags that act as semaphores that may control the way the knowledge base 16 is employed. For example, the flags may be employed to indicate the need for specialized knowledge bases, that certain Senses should be restricted from being presented to the user, or that different processes or algorithms should be used for selecting the meaning to be presented for a Sense.

In implementation, the depicted databases 16 and 18 may be realized as any suitable database system, including a system built on a commercially available database system such as the Microsoft Access database, and may be a local or distributed database system. The design and development of suitable database systems are described in McGovern et al., *A Guide To Sybase and SQL Server, Addison-Wesley* (1993). The databases 16 and 18 may be supported by any suitable persistent data memory, such as a hard disk drive, RAID system, tape drive system, floppy diskette, or any other suitable system.

Returning to FIG. 1 it may be seen that the query engine 14 may employ the knowledge base 16 to identify meanings that may be associated with the user query provided by the user interface 12. To this end, the query engine may employ words and phrases from the user query to query the knowledge base 16 and collect therefrom one or more meanings that may be associated with the user query. In one practice, the knowledge base 16 provides to the query engine the union of the sets of meanings generated by each Sense of the user query. In one practice, these meanings are represented by a set of words that are generated by the knowledge base 16 and provided to the query engine to represent the meanings for those Senses associated with the user query. For example, the knowledge base 16 may provide to the query engine 14 words that are representative of a specific meaning provided for a particular Sense associated with the user query, a first word associated with a Sense that is not the given phrase and does not look like the given phrase (e.g., shares a common prefix), the meaning of the generalization for a Sense, the meaning of all Senses that have this Sense as their generalization, or optionally if no meaning is determined the knowledge base 16 may return a flag that tells the query engine no meanings were identified for the user query. The query engine may present the set of words provided by the knowledge base 16 to the controller 20.

Figure 6:
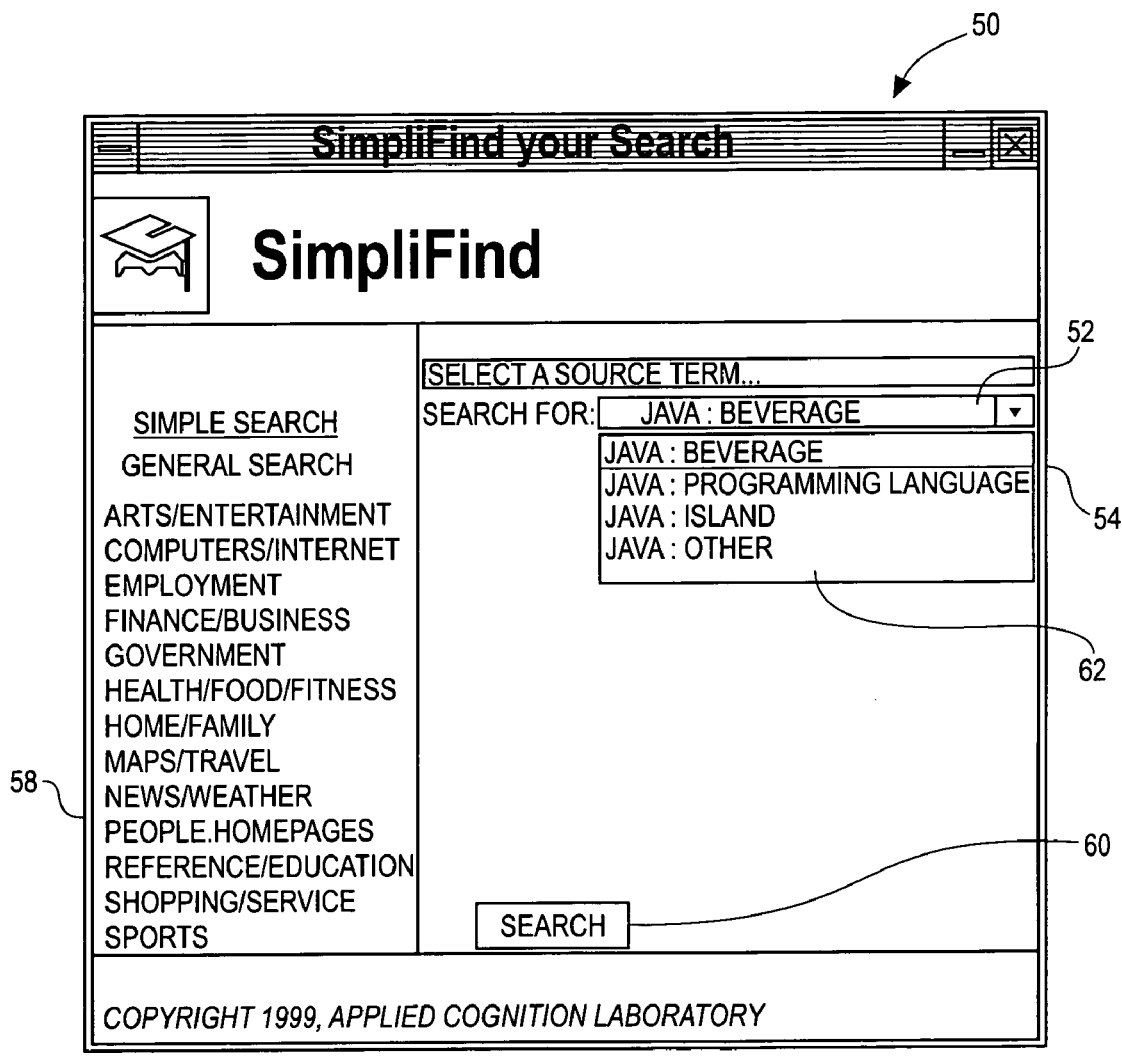
FIG. 6 depicts a user interface modified in response to the identification of a plurality of different meanings for a user query.

The controller 20 may act as an HTML page generator that may process the set of words provided from the knowledge base 16 and create therefrom a modified HTML search page that may be presented to the user as a new user interface 12. For example turning to FIG. 6, a modified web page 50 is presented which includes a text input field 52 along with a drop down box 54 that provides a plurality of different options to the user. As shown in FIG. 6 the modified interface 50 also includes a set of categories 58 and a search control mechanism 60. According to the drop down box 54 it may be seen that through this mechanism the HTML page provides to the user one or more of the meanings received from the knowledge base 16. The user may, typically by operation of a mouse input device, select one or more of the presented meanings. In this way, the user may disambiguate between a plurality of different meanings for the entered user query. HTML page generators of the type follow from principles known in the art, including those set out in Graham, *HTML Sourcebook*, Wiley Computer Publishing (1997), and allow for providing a plurality of different control devices, such as check boxes, radio buttons, text-fields and other such mechanisms to the user for indicating a selected meaning. Additionally, the controller can generate JavaScript, Applets, and other client side processes for collecting information from the user. Other such modifications can be employed without departing from the scope of the invention.

FIG. 6 further depicts that within the drop down box 54 and entry 62, in this example "java:other" is presented to the user. This option 62 allows the user to indicate to the system 10 that a meaning other than that presented to the user is to be associated with the search term. In one optional embodiment, the system 10 provides a profile database 18 for each user of the system 10. In this embodiment, the system 10 allows a user to select an option within the drop down box, such as option 62, that directs the controller 20 to present a web page to the user that collects from the user a new meaning to be associated with the user query. The new meaning may be transmitted to the query engine 14 and stored within the profile database 18 for subsequent use by the system 10 when the query engine 14 is searching the knowledge base 16 and profile database 18 for meanings to be associated with a user query. Optionally, the system 10 may employ a learning process 26 that adapts to individual users' styles by storing and tracking previous disambiguations. This learning process 26 may be a computer process that comprises an intelligent agent for the individual user while interfacing with the given search engine. In one practice, the system 10 may periodically compile information from users' personalized databases and use the compiled data to update the main database where necessary. Updating and maintaining the linguistic database is a two-fold process that enables the system 10 to create product "stickiness" and a more robust knowledgebase. The development of such a learning process 26, including such intelligent agent follows from principles known in the art, including those set forth in Winston, *Artificial Intelligence*, Addison-Wesley (1984). These learning processes may periodically compile the personalized databases at a main system server, or other suitable location. Optionally, the data may be analyzed with a statistical learning algorithm and verified by an operator before being entered into the main linguistic knowledgebase 16.

In either embodiment, after the user has selected a meaning to be associated with the user query the Query engine 14 may then build an expanded search query by employing the related terms, depicted in FIG. 3, to amend the user query to one more suited for identifying documents associated with the interest of the client. For example, if a user enters "java" as the user query and selects "coffee" as its meaning, the knowledgebase 16 will retrieve a number of related words (e.g., mocha, espresso) and append these words, along with the chosen meaning, to the original user query. Examples of such related terms are set forth in Table 2 below.

TABLE 2

Search Terms Generated by the Relational Knowledgebase for User Query "java"

| java (required) | decaffeinated coffee | ice coffee |
| coffee (meaning) | decaf | mocha |
| cafe au lait | espresso | Turkish coffee |
| cafe noir | capuccino | cafe royale |
| demitasse | coffee capuccino | beverage |
| | iced coffee | coffee royal |
| | | Irish coffee |

These related words provide additional keyphrases that may be added, such as by boolean logic operators or by other logical operators, to the keyphrases of the user query. For example, the original user query "java", can now be expanded to java+coffee+espresso(W1)+beverage(W2)+(NOT)programming. As expanded, the query now includes terms that are selected to increase the likelihood that an Internet search engine will return a meaningful hit list. To this end, the user query has been given new terms, including the word that represents the selected meaning, as well as a pari of additional words, expresso and beverage, each of which is weighted, W1 and W2 respectively. The weighting can be employed to indicate how significant the word is to the search, as well as for sorting through the returned hits, to rank the returned search results. Additionally, it can be seen that the search string includes a NOT operator that indicates that the word "programming" should not appear within the documents returned by the search. Thus, these related words may also be used to prioritize the results, or alternatively eliminate irrelevant, or less relevant hits. This enables the system 10 to bring the more relevant hits to the first pages of search results that will be returned to the user, while still allowing users to navigate through to the less relevant hits. This can be accomplished without additional effort on the part of the user, and the resulting expanded query is a complex query that may be invisible to the user.

Returning now to FIG. 1, it can be seen that the query engine having generated the expanded query can pass the expanded query to the splitter 22. The splitter 22 can be a computer process that analyzes and processes the expanded query to generate a plurality of search strings, each of which corresponds to the expanded query generated by the query engine 14 and each of which is placed into a format suitable for use with a respective one of the search engines 24, 28 or 30. The reformatted expanded query can be written as a query URL and provided to the respective search engine. The search engine can generate a HTML page that can be returned to the splitter 22. The splitter 22 can process the HTML page and extract the query results. For each query result, the splitter can record at least the URL, title of the page, the abstract, or other excerpt from the page, the date last modified, the size of the page and its relative ranking by the search engine as to relevance. The extracted information can be provided to a merger module within the splitter 22 that can process the individual query results from the different search engines and merge them to create output HTML pages that can be presented to the user via the user interface 12.

Figure 7:
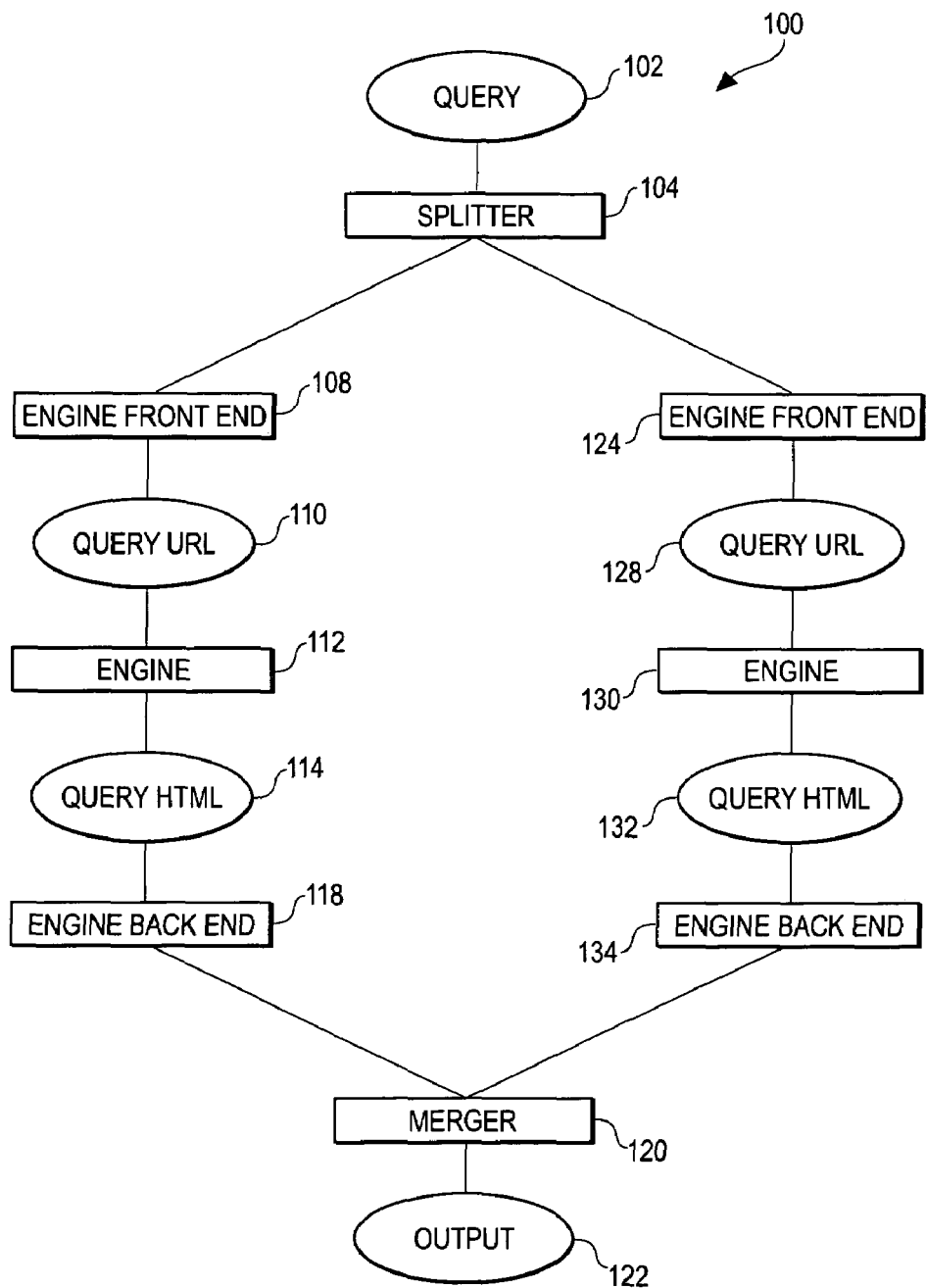
FIG. 7 depicts one process for applying an expanded user query to a plurality of different search engines.
Figure 8:
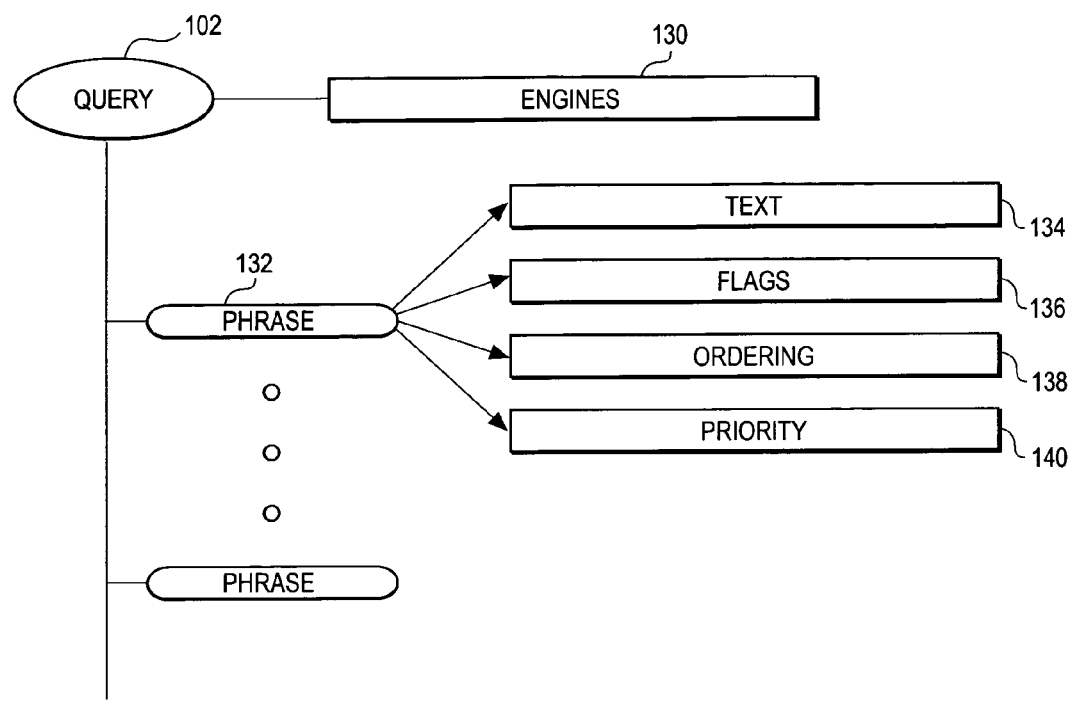
FIG. 8 depicts a data structure for storing and organizing information representative of an expanded user query.

FIG. 7 depicts a flow chart diagram of one process that can be implemented by the system 10 for applying an expanded query against a plurality of search engines. Specifically, FIG. 7 depicts a process 100 wherein an expanded query 102 is presented to the splitter module 104. The depicted expanded query 102 can comprise a data structure that has a plurality of different elements. FIG. 8 depicts an embodiment of a query 102 that includes a plurality of submembers, each of which provides information relevant to how the splitter process 22 should generate a query for a particular search engine. The embodiment of query 102 includes a first field 130 that identifies those search engines for the set of search engines that are to be used in the query. Identification can include an array of text fields, each of which includes an identifier for a particular search engine such as the Excite search engine or the Lycos search engine. The query 102 further includes a phrase element 132 that stores a plurality of submembers. As shown in FIG. 8, the submembers for phrase number 132 include the text submember 134, the flags submember 136, the ordering submember 138 and the priority submember 140. The text submember 134 may be representative of the text of the phrase. In the event that the phrase is a logical (boolean) expression, this can include the of that expression.

The flag submember 136 can include information representative of flag values that are to be added by the different actions and can be interpreted by the query processors for the different search engines 24, 28 and 30. Typically, flags are employed to provide information that indicates the reason as to why a term was added, for example, the type of action. The ordering subelement 138 can include information that is representative of a numeric value that can be employed for ordering the phrases before presenting them to the interface of a search engine. The priority submember 140 can include information that is representative of an estimate of the importance of this phrase to the query. The numeric value of this datum can range from, in one embodiment, 1.0, indicating a phrase that must be present, and down to 0.0 to represent a phrase that can be ignored. Optionally, it can be capable of providing negative indicators representing the fact that a word or phrase should not appear within information, such as a web page that is to be retrieved by the search engine.

Returning again to FIG. 7, it can be seen that the splitter process in step 104 can take the internal form of the query, such as the internal form presented in FIG. 8, and determine which search engine to run, as well as how often. It will be understood that the same search engine can be run a plurality of times if a large number of results is expected from that search engine or if that search engine is to be employed in different ways. For each search engine, the splitter process starts up a plurality of processes, each of which can be run in parallel as graphically depicted by the two separate parallel processes depicted in FIG. 7. After step 104, the process 100 can proceed to step 108 and step 124. For purposes of clarity, the process 100 will be described with respect to steps 108 through 118, however will be understood that the description for steps 108 through 118 apply to the parallel process represented by steps 124 through 134 within process 100. Process 100 in step 108 can apply an engine front end process that can take the set of phrases within the query 102 that are part of the query representation and map the phrases in query representation into a form that the search engine can understand. In one embodiment, this step occurs as part of a table, driven process where a description of how to generate a URL for each phrase is provided for each type of search engine. After step 108, the process 100 proceeds to step 110, where a query URL is generated. This query URL represents the URL that is to be passed to the external search engine. In step 112, the respective search engine processes the query URL and generates an output page that typically is an HTML page containing search results for that search engine. The process 100 can then proceed to step 114, wherein the HTML results from the search engine are provided back to the system 10 for processing. This processing can occur at the engine back end step 118, wherein the module takes the HTML page returned by the search engine and extracts the query results from that page. In a subsequent step 120, the information collected from the pages provided by all the search engines can be merged together and an output HTML page can be generated for being presented to the user.

As can be seen from the above, the invention in one aspect includes a front-end user interface that allows users to search the Internet in a fast and efficient manner. To achieve this, the front end user interface incorporates three interfaces: an interactive search option with interactive query disambiguation, a search option with multiple fields, and a category profile search option with automatic query expansion. The interactive search form provides an efficient way to narrow a search without placing extra demands on the user. The alternative systems incorporate multiple text entry fields to encourage the user to enter more information than would be entered through a traditional interface.

It will be understood that although FIG. 1 graphically depicts the system 10 as a plurality of functional block elements, these elements may be realized as computer programs or portions of computer programs that are capable of running on a data processor platform to thereby configure the data processor as a system according to the invention. Thus the systems can be realized as software systems, hardware systems, and combinations of software and hardware systems. Moreover, although FIG. 1 depicts the system 10 as an integrated unit comprising a plurality of components all directly interconnected, it will be apparent to those or ordinary skill in the art that this is only one embodiment, and that the invention may be embodied as a plurality of computer programs and databases that are distributed across a plurality of network nodes, and that employ a client-server architecture. Accordingly, it is not necessary that the query engine 14 be directly coupled to the knowledgebase 16, or any other component, and other arrangements can be employed for implementing a system according to the invention. Moreover, it will be understood to those of ordinary skill in the art that the depiction of the system 10 as a plurality of separate components is merely representational, and that the boundaries of the depicted components, particularly for software embodiments of the invention, can vary and that different components can be integrated into single systems, or even further subdivided into additional elements.

The systems and processes described above may be realized as software components operating on a conventional data processing system such as a Unix workstation. The components may be implemented as a C language computer program, or a computer program written in any high level language including C++, Fortran, Java or Basic. In an embodiment where microcontrollers or DSPs are employed, the components may be realized as a computer program written in microcode or written in a high level language and compiled down to microcode that may be executed on the platform employed. The development of such programs follows from principles known in the art, including general techniques for high level programming, such as those set forth in, for example, Stephen G. Kochan, *Programming in C*, Hayden Publishing (1983).

Those skilled in the art will know or be able to ascertain using no more than routine experimentation, many equivalents to the embodiments and practices described herein. For example, the systems and processes described herein can be employed with intranets, and standalone systems such as kiosks used to provide information. The front end systems can be employed with any type of database wherein information is retrieved in response to a query. The invention can be realized as software components that can be added to existing systems, as well as newly created systems with the front end integrated into the system. The systems can also be used as stand alone systems that generate terms and strings that a user can be given directly, so that the user has the option of providing the expanded search query to a database system. Accordingly, it will be understood that the invention is not to be limited to the embodiments disclosed herein, but is to be understood from the following claims, which are to be interpreted as broadly as allowed under the law.

I claim:

1. A process for aiding a user in developing a search request, comprising
   presenting to the user an interface for collecting from the user a keyphrase representative of a user search request,
   analyzing said user search request to identify at least one meaning associated with said user search request,
   processing said user search request and said at least one meaning to generate an expanded search request represented as a boolean search strategy, wherein the expanded search request includes related terms not defined or chosen by the user, the related terms being amended to the user search request and the one meaning in a weighted string; and
   providing said expanded search request to a search engine capable of identifying information associated with said expanded search request.

2. The process according to claim 1, wherein presenting to the user an interface includes providing a source of profile data representative of information that is displayed to the user for guiding the user to supply information for refining the user search request.

3. The process according to claim 2, wherein providing said source of profile data includes providing category information capable of being selected by the user to identify a topic associated with the user search strategy.

4. The process according to claim 3, wherein providing said source of profile data includes providing subcategory information capable of being displayed to the user in response to the user selection of category and capable of providing information for refining the user search strategy.

5. The process according to claim 1, wherein analyzing said user search request includes determining whether a plurality of meanings is associated with said user search request.

6. The process according to claim 1, wherein analyzing said user search request includes
   matching a portion of said keyphrase to a linguistic database to identify a list of associated meanings.

7. The process according to claim 6, including an act processing said list of associated meanings to generate a display that presents to the user a plurality of meanings associated with said keyphrase to aid the user in disambiguating between said plural meanings.

8. The process according to claim 6, including an act of processing said list of associated meanings to generate a menu of choices that is selected by the user to assign at least one of said associated meanings to said keyphrase.

9. The process according to claim 6 wherein analyzing said user search request includes
   adjusting said user interface as a function of said associated meaning to present to the user a request for information for refining said user search request.

10. The process according to claim 1, wherein analyzing a search request includes generating a user linguistic database for the user, wherein the linguistic database is separate from a knowledgebase, and wherein the linguistic database is representative of keyphrases and associated user-defined meanings.

11. The process according to claim 1, wherein analyzing a search request includes accessing demographic information associated with the user for generating said expanded search request.

12. The process according to claim 1, wherein processing said user search request and said at least one meaning to generate an expanded search request, includes
   accessing a linguistic knowledgebase having information representative of a list of sense signals, each sense signal being information for describing a linguistic meaning, and a list of words.

13. The process according to claim 12, including employing said keyphrase to access said user linguistic knowledgebase and identify a sense signal associated with said keyphrase.

14. The process as claimed in claim 1, wherein the expanded search includes a NOT operator in association with a related term.

15. The process as claimed in claim 1, wherein the related terms are weighted in accordance with the relevance of the related term to the search request and the one meaning.

16. A system for aiding a user in developing a search request, comprising
   a linguistic knowledgebase having information representative of a list of sense signals, each sense signal being information for describing a linguistic meaning, and a list of weighted and unweighted words, wherein weighted words are weighted in relation to a potential query term;
   a controller for generating an interface for collecting from the user a keyphrase representative of a user search request, and for employing said keyphrase to access information from said linguistic knowledgebase to generate an expanded search request, and
   a query mechanism for processing said expanded search request to generate a set of boolean search requests, each said boolean search request associated with at least one preselected search engine, wherein each of the boolean search requests corresponds to the expanded search request; and for providing each said boolean search request to a respective preselected search engine.

17. The system according to claim 16, further including
   a controller for adjusting the interface, as a function of information accessed from said linguistic knowledgebase, for guiding the user in disambiguating between meanings for the keyphrase.

18. The system according to claim 16, further comprising:
   a mechanism for generating a user linguistic database for the user, wherein the user linguistic database is separate from the linguistic knowledgebase, and wherein the user linguistic database is representative of keyphrases and associated user-defined meanings.

19. The system according to claim 16, further comprising
   means for identifying demographic information associated with said user and for employing said demographic information for expanding said user search request.

20. The system according to claim 16, wherein said controller further includes means for accessing flag signals from said linguistic knowledgebase, wherein the flag signals are associated with a sense signal and identify a condition of use of words associated with the sense signal in the generation of the expanded search request.

21. The system as claimed in claim 16, wherein each boolean search request is formatted in accordance with the respective preselected search engine.

22. The system as claimed in claim 16, wherein the query mechanism receives search results from each preselected search engine, and further comprising:

a merger module, wherein the merger module processes the search results received from each preselected search engine for presentation to the user, wherein each entry in the search results is weighted based upon the relevance of the entry in relation to the terms of the original expanded search request.

* * * * *